United States Patent

Scherwey

[11] Patent Number: 5,841,986
[45] Date of Patent: Nov. 24, 1998

[54] METHOD FOR THE TRANSMISSION OF BINARY ASYNCHRONOUS DATA VIA A SYNCHRONOUS CHANNEL

[75] Inventor: Roland Scherwey, Tentlingen, Switzerland

[73] Assignee: Asea Brown Boveri AG, Baden, Switzerland

[21] Appl. No.: 707,601

[22] Filed: Sep. 5, 1996

[30] Foreign Application Priority Data

Nov. 16, 1995 [DE] Germany ................ 195 42 715.7

[51] Int. Cl.⁶ ........................................ G06F 3/00
[52] U.S. Cl. ............................. 395/200.66; 395/854
[58] Field of Search ..................... 395/200.3, 200.66, 395/200.6, 850, 854, 200.8

[56] References Cited

U.S. PATENT DOCUMENTS

| | | | |
|---|---|---|---|
| 4,313,338 | 2/1982 | Renoulin | 370/89 |
| 4,569,062 | 2/1986 | Dellande | 375/117 |
| 5,054,020 | 10/1991 | Meagher | 370/48 |
| 5,200,952 | 4/1993 | Bernstein | 370/79 |
| 5,208,807 | 5/1993 | Gass | 370/60.1 |
| 5,251,209 | 10/1993 | Jurkevich | 370/82 |

FOREIGN PATENT DOCUMENTS

3934045C2  8/1994  Germany .

OTHER PUBLICATIONS

"Data transmission", Data Communications, Computer Networks and Open Systems, F. Halsall, 3rd Ed. 1992, pp. 73–142.

*Primary Examiner*—Eric Coleman
*Attorney, Agent, or Firm*—Burns, Doane, Swecker & Mathis, L.L.P.

[57] ABSTRACT

A method is specified for the transmission of binary asynchronous data, with a data word length of N bits, from a transmitter via a synchronous channel to a receiver. Maximum utilization of the transmission capacity of the synchronous channel is achieved as a result of the fact that the data words are extracted from the asynchronous data and are split up in encoded form between frame words, to be transmitted, of a frame.

10 Claims, 5 Drawing Sheets

Fig. 2

| | BIT 7 | 6 | 5 | 4 | 3 | 2 | 1 | 0 |
|---|---|---|---|---|---|---|---|---|
| 8 | 0 | P | D5 | D4 | D3 | D2 | D1 | D0 |
| 7 | 0 | D7 | D6 | P | D3 | D2 | D1 | D0 |
| 6 | 0 | D7 | D6 | D5 | D4 | P | D1 | D0 |
| 5 | 0 | D7 | D6 | D5 | D4 | D3 | D2 | P |
| 4 | 0 | D7 | D6 | D5 | D4 | D3 | D2 | D1 |
| 3 | 0 | D7 | D6 | D5 | D4 | D3 | P | D0 |
| 2 | 0 | D7 | D6 | D5 | P | D2 | D1 | D0 |
| 1 | 0 | D7 | P | D4 | D3 | D2 | D1 | D0 |
| 0 | 0 | D6 | D5 | D4 | D3 | D2 | D1 | D0 |

Fig. 3

| | BIT 7 | 6 | 5 | 4 | 3 | 2 | 1 | 0 |
|---|---|---|---|---|---|---|---|---|
| 7 | 0 | D7 | D6 | D5 | D4 | D3 | D2 | D1 |
| 6 | 0 | D7 | D6 | D5 | D4 | D3 | D2 | D0 |
| 5 | 0 | D7 | D6 | D5 | D4 | D3 | D1 | D0 |
| 4 | 0 | D7 | D6 | D5 | D4 | D2 | D1 | D0 |
| 3 | 0 | D7 | D6 | D5 | D3 | D2 | D1 | D0 |
| 2 | 0 | D7 | D6 | D4 | D3 | D2 | D1 | D0 |
| 1 | 0 | D7 | D5 | D4 | D3 | D2 | D1 | D0 |
| 0 | 0 | D6 | D5 | D4 | D3 | D2 | D1 | D0 |

Fig. 6

| | BIT 7 | 6 | 5 | 4 | 3 | 2 | 1 | 0 |
|---|---|---|---|---|---|---|---|---|
| 5 | 0 | D5 | D4 | D3 | D2 | D1 | D0 | D5 |
| 4 | 0 | D4 | D3 | D2 | D1 | D0 | D5 | D4 |
| 3 | 0 | D3 | D2 | D1 | D0 | D5 | D4 | D3 |
| 2 | 0 | D2 | D1 | D0 | D5 | D4 | D3 | D2 |
| 1 | 0 | D1 | D0 | D5 | D4 | D3 | D2 | D1 |
| 0 | 0 | D0 | D5 | D4 | D3 | D2 | D1 | D0 |

Fig. 7

| | BIT 7 | 6 | 5 | 4 | 3 | 2 | 1 | 0 |
|---|---|---|---|---|---|---|---|---|
| 4 | 0 | D4 | D3 | D2 | D1 | D0 | D4 | D3 |
| 3 | 0 | D2 | D1 | D0 | D4 | D3 | D2 | D1 |
| 2 | 0 | D0 | D4 | D3 | D2 | D1 | D0 | D4 |
| 1 | 0 | D3 | D2 | D1 | D0 | D4 | D3 | D2 |
| 0 | 0 | D1 | D0 | D4 | D3 | D2 | D1 | D0 |

Fig. 8

| | BIT 7 | 6 | 5 | 4 | 3 | 2 | 1 | 0 |
|---|---|---|---|---|---|---|---|---|
| 3 | 0 | D3 | D2 | D1 | D0 | D3 | D2 | D1 |
| 2 | 0 | D0 | D3 | D2 | D1 | D0 | D3 | D2 |
| 1 | 0 | D1 | D0 | D3 | D2 | D1 | D0 | D3 |
| 0 | 0 | D2 | D1 | D0 | D3 | D2 | D1 | D0 |

Fig. 9

| | BIT 7 | 6 | 5 | 4 | 3 | 2 | 1 | 0 |
|---|---|---|---|---|---|---|---|---|
| 2 | 0 | D2 | D1 | D0 | D2 | D1 | D0 | D2 |
| 1 | 0 | D1 | D0 | D2 | D1 | D0 | D2 | D1 |
| 0 | 0 | D0 | D2 | D1 | D0 | D2 | D1 | D0 |

Fig. 10

| | BIT 7 | 6 | 5 | 4 | 3 | 2 | 1 | 0 |
|---|---|---|---|---|---|---|---|---|
| 1 | 0 | D1 | D0 | D1 | D0 | D1 | D0 | D1 |
| 0 | 0 | D0 | D1 | D0 | D1 | D0 | D1 | D0 |

Fig. 11

| START | D0 | D1 | D2 | D3 | D4 | D5 | D6 | D7 | D8 | STOP |
|---|---|---|---|---|---|---|---|---|---|---|

5,841,986

METHOD FOR THE TRANSMISSION OF BINARY ASYNCHRONOUS DATA VIA A SYNCHRONOUS CHANNEL

BACKGROUND OF THE INVENTION

1. Field of the Invention

The invention relates to the field of data transmission technology. It is based on a method for the transmission of binary asynchronous data, with a data word length of N bits, from a transmitter via a synchronous channel to a receiver.

2. Discussion of Background

Transmission of binary asynchronous data is described, for example, in the book "Data Communications, Computer Networks and Open Systems" by Fred Halsall, Addison-Wesley Publishing Company, 1992, on pages 73–142. When asynchronous data are being transmitted from a transmitter via a synchronous channel to a receiver, the data must be synchronized to the clock of the autonomously operating channel, for example a PCM network. A first option is to sample the asynchronous data at a fixed frequency and to transmit the values obtained in this way synchronously. However, this method has the disadvantage that the isochronous distortion becomes greater as the Baud rate increases. A second option is to process the asynchronous data using a UART (Universal Asynchronous Receiver/Transmitter) and to output the processed data, for example, to a synchronous 64-kbit channel. This is no problem for low baud rates since the data can be output on a channel having a higher bit rate without any major encoding cost. However, it is impossible to transmit asynchronous data having a baud rate of up to or even more than the bit rate of the synchronous channel.

SUMMARY OF THE INVENTION

Accordingly, one object of the invention is therefore to provide a novel method for the transmission of binary asynchronous data, with a data word length of N bits including possible parity bits, from a transmitter via a synchronous channel to a receiver, by means of which method the asynchronous data at a baud rate of up to X kilobaud can be transmitted with minimal delay on a synchronous channel having a capacity of X kbit/s.

Asynchronous data comprise a number of data bits (=one data word), which are enclosed by preferably one start bit and one stop bit. It is now the essence of the invention that the data words are extracted from the asynchronous data. The data words are subsequently encoded in that they are split between frame words, to be transmitted, of a frame. One bit in the frame is used to distinguish between frame words and control words. Thus, as a result of the fact that no complete data words, one complete data word or a plurality of data words can be transmitted per frame word—depending on the number of data bits—a transmission counter, whose value corresponds to the number of transmitted frame words, is also produced and is also transmitted cyclically. A reception counter is accommodated in the receiver for the decoding of the data words, the value of which reception counter is continuously synchronized to the value of the transmitted transmission counter. The transmission/reception counters are thus used to match the receiver to the transmitter, so that the data words can be decoded without errors.

An advantageous feature of the invention is, in particular, that the transmission capacity of the channel can be virtually completely utilized and only a minimal data transmission delay is incurred.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows an example of the encoding of 8-bit-long data words in accordance with the method according to the invention, with a parity bit (N=9);

FIG. 3 shows an example of the encoding of 8-bit-long data words in accordance with the method according to the invention, without a parity bit (N=8);

FIGS. 6–10 show further examples of frames where N=6, 5, 4, 3, 2;

FIG. 11 shows an illustration of an asynchronous data word.

Figure 1:
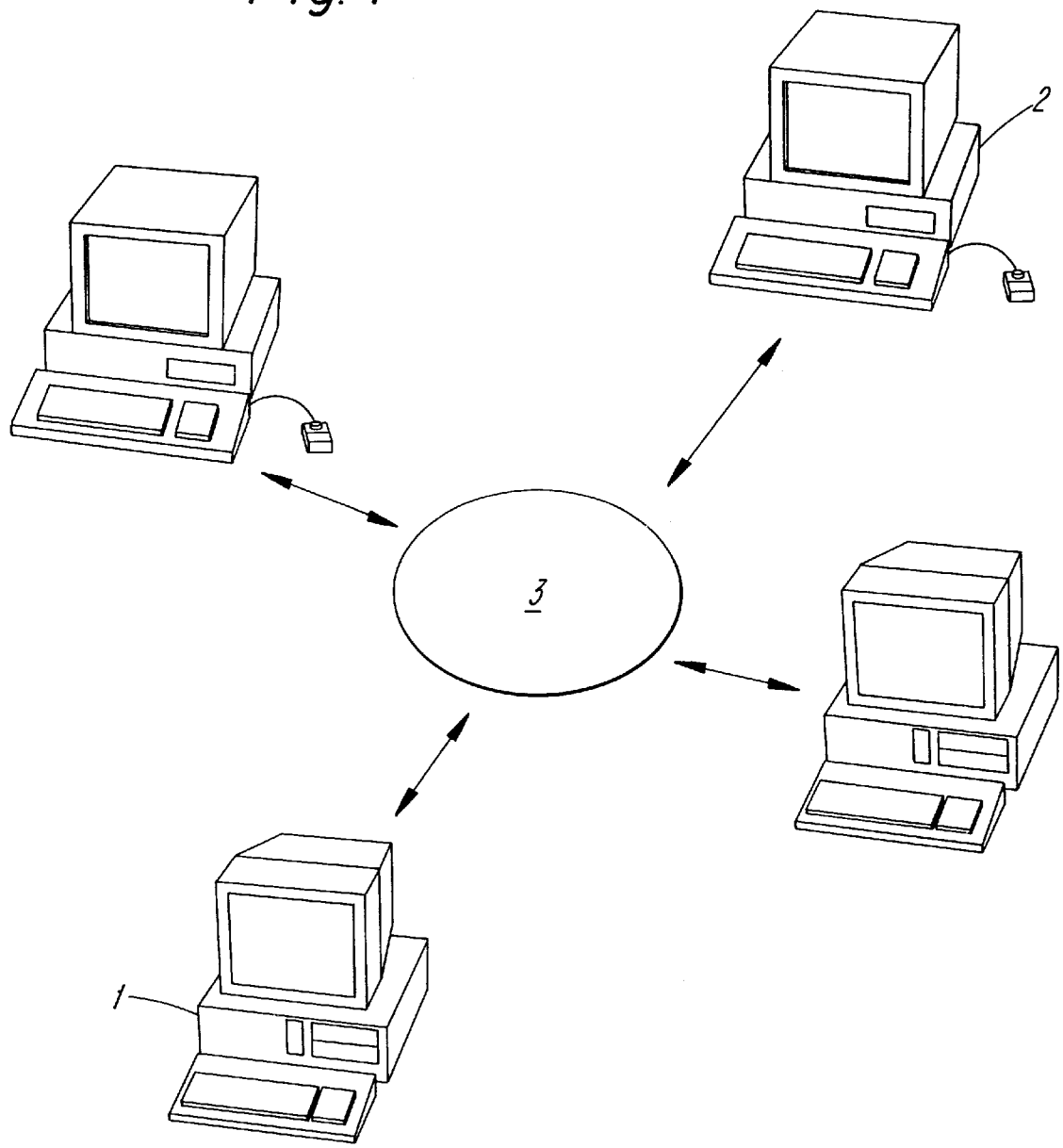
FIG. 1 shows an arrangement of a plurality of computers which are connected via a synchronous channel, for which arrangement the method according to the invention for the transmission of asynchronous data between the computers is suitable.

The designations used in the drawings, and their meanings, are listed in summarized form in the List of Designations.

DESCRIPTION OF THE PREFERRED EMBODIMENTS

Referring now to the drawings, wherein like reference numerals designate identical or corresponding parts throughout the several views, FIG. 1 shows an arrangement having a plurality of computers which are connected to one another via a channel 3. If it is intended to transmit data from one computer to another, then one computer acts as the transmitter 1 and the other as the receiver 2. For example, in the case of the channel 3 this may be a PCM network. The channel then operates autonomously and independently of the transmitter or receiver, using its own clock. This is referred to as a synchronous channel. The asynchronous data to be transmitted occur independently of the working clock of the channel. Asynchronous data comprise a data word having a data word length of N bits including possible parity bits. The data word is enclosed by start and stop bits (see FIG. 11). Normally, one start bit and 1, 1.5 or 2 stop bits are used. These data must be synchronized to the clock of the channel. Figuratively speaking, a method must be provided by means of which the data can be retrieved from the channel periodically.

According to the prior art, it is currently impossible to transmit asynchronous data from one computer to the other at a baud rate of up to or even more than the bit rate of the synchronous channel which is used as the transmission medium. Transmission bandwidth is lost as a result of the transmission of start and stop bits. The problem exists not only in the case of the example mentioned above with computers connected via a PCM network, but in quite general form in the case of any transmission system for asynchronous data having a transmitter, a receiver and a synchronous channel.

In accordance with the method according to the invention, a transmission rate of up to or even more than X bauds is achieved with the synchronous channel having a bandwidth of Xbit/s in that the data words having a data word length of N bits are extracted from the asynchronous data and are split up during the encoding over a frame having a frame width of M bits.

The start and stop bits of the asynchronous data are suppressed for the extraction of the data words. So-called frame words are produced during the encoding. One bit of the frame, preferably the MSB, is used to distinguish between frame words and control words. The frame words formed in this way are then transmitted using the clock of the synchronous channel. Thus, one frame word or one control word is always transmitted per clock period of the channel.

FIG. 3 shows an example using 8-bit-long data words (D0 . . . D7, N=8). These are split up over a frame of 8 bits (M=8). FIG. 2 shows the corresponding case with an additional parity bit P (N=8). Since the frame width is less than (N=9, M=8), equal to (N=M=8) or greater than (N=7, 6, 5, . . . , M=8) the data word length including possible parity bits, the data bits of a data word must either be split up between a plurality of frame words (N=8, 9), or the bits of a frame word must be filled with the bits from a plurality of data words (N<=6). The splitting of the data bits is thus shifted from frame word to frame word. The case where N=7, and in which a data word precisely matches a frame word, forms an exception.

Because of this variable splitting of the data bits between the frame bits, a transmission counter is produced whose value is also transmitted cyclically for synchronization of the receiver to the transmitter. The value of the transmission counter in this case corresponds to the number of transmitted frame words. A reception counter is accommodated in the receiver and its value is repeatedly synchronized to the value of the transmission counter which is also transmitted. Error-free assignment of the received bits to the bits of a data word can be carried out in the receiver on the basis of the state of the reception counter. In this way, it is possible to extract the original data bits from the frame words. The data words can once again be provided, for example, with a start bit and stop bit for further processing.

Let us assume that the data words have a length of 8 bits. The frame width is assumed to be of the same length. In the case in which no parity bit is produced, the splitting of the data bits between the frame words is repeated after 8 cycles. The frame thus has a length of 8. In the case of an additional parity bit, the total data word length is increased to 9. The transmission counter is now always incremented modulo the frame length, the frame length corresponding to the number of data bits plus possible parity bits.

As already mentioned initially, the data words occur asynchronously with respect to the clock of the synchronous channel, and at irregular intervals. It is therefore possible for the case to arise in which there are no longer any other data words for transmission, but the transmission of a data word has not yet been completed because of the splitting between the frame words. In order to allow these situations to be identified in the receiver, two control words are produced. The first of these (ST1) is transmitted when the transmission of the data words has been entirely completed and there are no further data. The receiver then declares the last received bits of the supposedly newly received data word to be invalid. The second control word (ST2) is transmitted when there are no further data words in the transmitter but the last data word has not yet been completely transmitted. It is thus used to signal to the receiver that there are still further data to follow. The receiver thus waits for a further clock period in order to receive any remaining data bits.

These control words are very highly suitable for the transmission of the transmission counter. The control words for a frame width of 8 bits can accordingly be made up, for example, as follows:

The MSB is used to distinguish between control words and frame words and, for example, in the case of the control words is set to "1". The first four bits seen from the LSB, that is to say bits 0 . . . 3, are set to the value of the transmission counter. The fourth bit is a parity bit. The fifth bit is used to distinguish between the first control word and the second control word and is set to "0" for the first control word and to "1" for the second. The sixth bit is permanently set to "0". This has the advantage that any interruption in the channel is not interpreted as a control word. This is because, in the case of a PCM channel, an interruption is signaled by all "1's" ("AIS"=Alarm Indication Signal).

Figure 4:
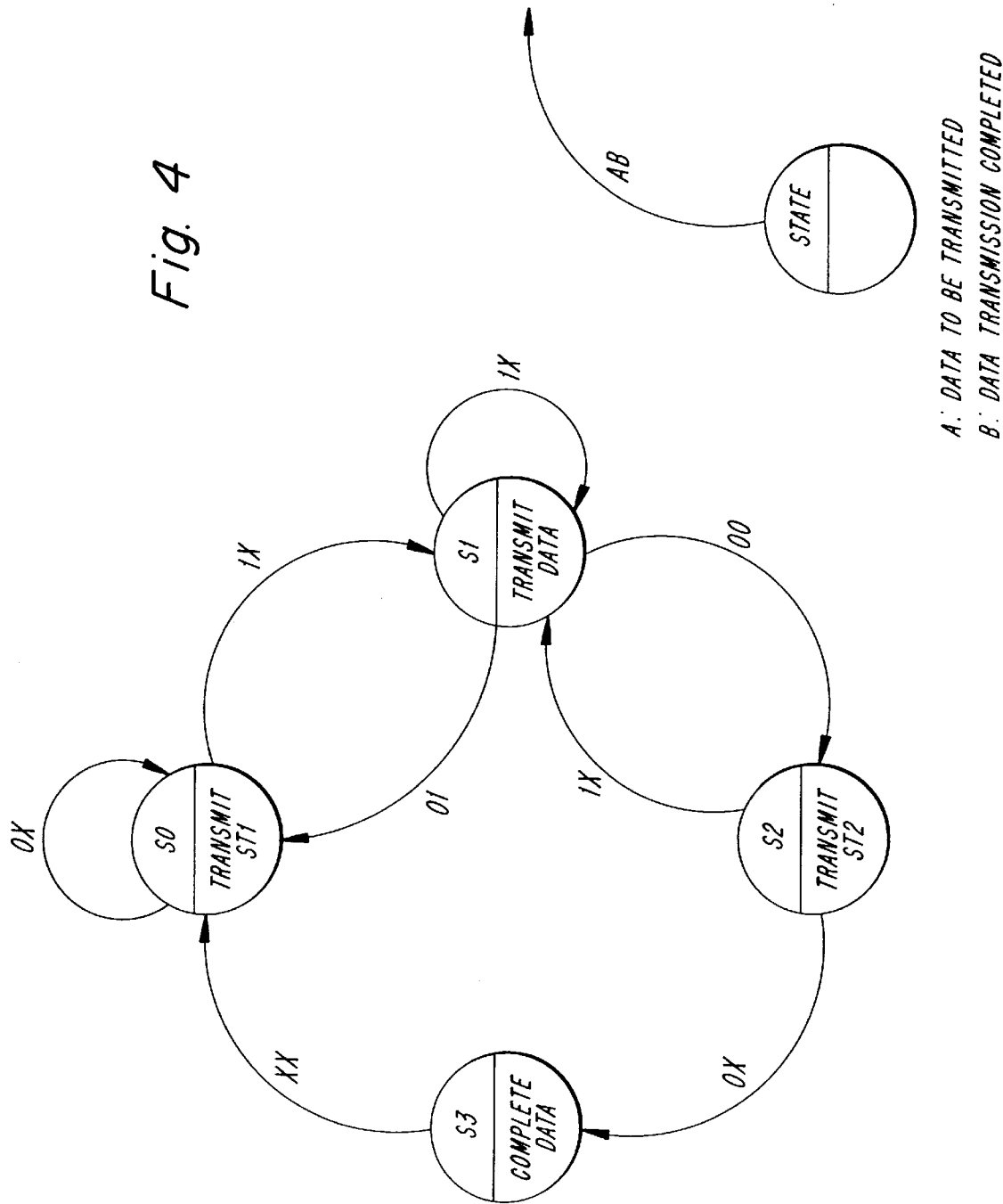
FIG. 4 shows a state diagram for the transmission process of the method according to the invention.
Figure 5:
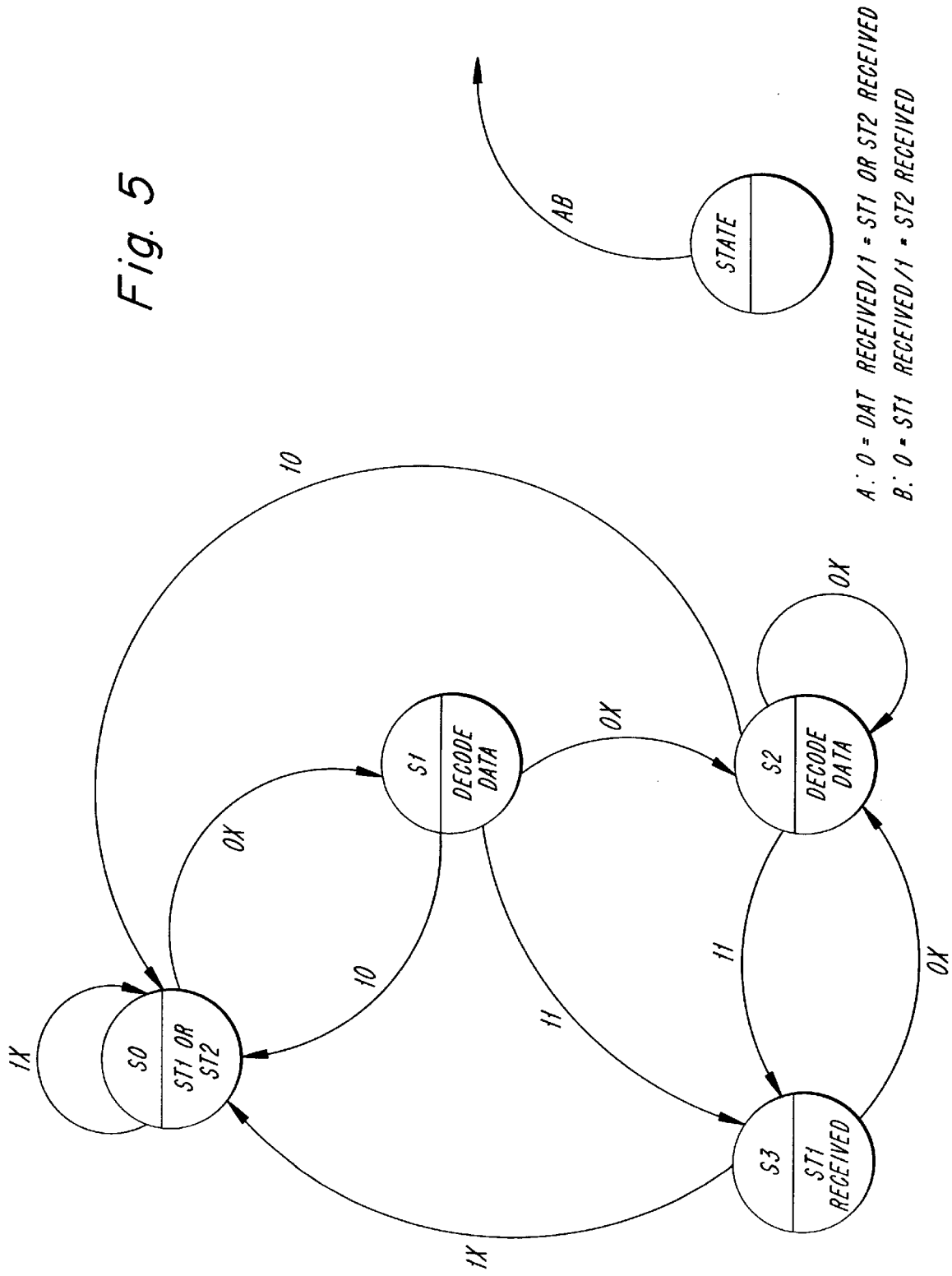
FIG. 5 shows a state diagram for the reception process of the method according to the invention.

The following text refers to FIGS. 4 and 5, which show state diagrams for the transmission protocol and reception protocol respectively. Both processes are synchronized to the clock of the synchronous channel, that is to say the conditions are checked in each clock period to determine whether possibly to change a state. The statements are based on the implemented and successfully tested exemplary embodiment with 8 data bits+1 parity bit (=1 data word) and a frame width of 8 bits.

FIG. 4 shows the state diagram for the transmission protocol. S0 to S3 designate four different states. The conditions for the transition from one state to the other are entered alongside the arrows. "1" means "is satisfied", "0" means "is not (yet) satisfied" and "X" means "irrelevant". The conditions are shown in the legend at the bottom right of the figure: the first digit or "A" means: there are data for transmission. The second digit or "B" means: the data have been completely transmitted.

State 0 (S0): The first control word ST1 is transmitted with the current transmission counter reading in this state. If there are no data for transmission, the transmitter remains in this state. If there are data for transmission, a change is made to state S1.

State 1 (S1): There are data or there are still further data to transmit. The data words to be transmitted are thus fitted into frame words and transmitted depending on the transmission counter. If the transmission counter is less than the frame length, it is incremented, otherwise it is set to zero (modulo function). If there are still data and these data have not yet been completely transmitted, the transmitter remains in this state. If there are no more new data but the current data have not yet been completely transmitted, then the transmitter changes to the state S2: ST2 is transmitted. If there are no more data to transmit and the current data have already been completely transmitted, then the transmitter changes back to state S1.

State 2 (S2): There are no more data for the first time and the last data word has not yet been completely transmitted. The control word ST2 is transmitted. If there are further data, then a change is made back to state S1 and the data are transmitted. If there are no new data, then a change is made to state S3 and the data bits which are still to be transmitted are finally transmitted.

State 3 (S3): There are no more data, for the second time. The rest of the current data word can thus be transmitted. However, the first control word ST1 must be transmitted next in all cases, and a change is thus made back to state S0.

FIG. 5 shows the state diagram of the reception protocol. Once again, the various states are designated S0 to S3. The conditions for a state change are shown at the bottom right. The first digit A means: data or a control word ST1 or ST2 have been received. The second digit B means: the control word ST1 or ST2 has been received.

State 0 (S0): The first control word ST1 has been received. If the parity bit is correct, the reception counter is synchronized to the transmission/reception counter contained in the control word ST1. If no data, that is to say frame words with an MSB="0", have been received, then the receiver remains in the state S0. If, in contrast, data have been received, then a change is made to the state S1.

State 1 (S1): The first part of a data word has been received. This is decoded depending on the state of the transmission/reception counter. In the event of a reception, counter value from 0 to 3 and from 5 to 7, the reception of a data word is started. Reception counter values of 4 and 8 are not possible in this state since, in this case, the reception of a data word cannot be started, but at most one data word can be completed or the second part of a data word can be received, see FIG. 2. (In the case of 8 data bits without parity, which is not considered at this point, this applies in a corresponding manner to the reception counter values of 0 to 6 and 7). The reception counter is incremented by one in each case. If a control word, to be precise ST1, is received next, this means that the data have not yet been completely transmitted and a change is made back to state S0. If, in contrast, ST2 is received, that is to say no more new data have been transmitted, but the current data have not yet been completely transmitted, then a change is made to state S3. On reception of further data, a change is made to state S2 and the data words are extracted from the frame words.

State 2 (S2): A data word has been received. This is decoded depending on the state of the transmission/reception counter. In the event of a reception counter value from 1 to 3 and from 5 to 7, the reception of a data word is completed and the first part of a new data word is started at the same time. (In the case of 8 data bits without parity, which is not considered at this point, this applies in a corresponding manner to the reception counter values from 1 to 6). In the event of reception counter values of 0 or 4, the reception of a data word has only started or has not yet been completed. In the event of a reception counter value of 8, only the reception of a data word has been completed. (In the case of 8 data bits without parity, which is not considered at this point, this applies in a corresponding manner to the reception counter value of 7). The reception counter is incremented by one if it is less than the frame width, otherwise it is set to zero (modulo function). If further data are received, that is to say frame words where MSB="0", then the receiver remains in state S2 and the data words are extracted from the frame words with the aid of the reception counter. However, if ST1 is received, then the receiver changes back to the state S0. If ST2 is received, a change is made to state S3.

State 3 (S3): The second control word ST2 has been received. Since there are further data still to follow, if the parity bit is correct, only the reception counter is synchronized to the transmission counter of the control word ST2. If these data are actually received, then a change is made back to state S2 and the data are extracted. If there are no more data, a change is made back to state S0 and the data word which may possibly have newly started is declared to be invalid.

These protocols can be implemented either by hardware, in a logic circuit, or by software.

With the chosen encoding method, a signaling rate of, for example, 1 kbit/s (for the control words) and a bandwidth of 64 kbit/s for the channel, the following maximum usable channel bandwidth is obtained:

$$\frac{7 \text{ wanted bits}}{8 \text{ bits}} * \text{bandwidth} - \text{signaling bandwidth} =$$

$$\frac{7}{8} * 64 \text{ kbit/s} - 1 \text{ kbit/s} = 55 \text{ kbit/s}$$

The asynchronous data baud rate which can be used with encoding methods according to the invention depends on the data word length (N bits) and the manner of fitting into the asynchronous data (number of stop bits).

max. baud rate = usable bit rate *

$$\frac{\text{bit number } N}{\text{bit number } N + \text{start bit} + N \text{ stop bits}}$$

The following table shows the maximum baud rate for the asynchronous data:

| No. of bits N | Max. baud rate for 1 stop bit | Max. baud rate for 1.5 stop bits | Max. baud rate for 2 stop bits |
|---|---|---|---|
| 9 | 67222 | 70278 | 73333 |
| 8 | 68750 | 72188 | 75625 |
| 7 | 70714 | 74643 | 78571 |
| 6 | 73333 | 77917 | 82500 |
| 5 | 77000 | 82500 | 88000 |
| 4 | 82500 | 89375 | 96250 |
| 3 | 91667 | 100833 | 110000 |
| 2 | 110000 | 123750 | 137500 |

With the chosen encoding method, a signaling rate of, for example, 1 kbit/s and a bandwidth of 56 kbit/s for the channel, the following maximum usable channel bandwidth is obtained:

$$\frac{7 \text{ wanted bits}}{8 \text{ bits}} * \text{bandwidth} - \text{signaling bandwith} =$$

$$\frac{7}{8} * 56 \text{ kbit/s} - 1 \text{ kbit/s} = 49 \text{ kbit/s}$$

The asynchronous data baud rate which can be used with this encoding method depends on the data word length (N bits) and the manner of fitting into the asynchronous data (number of stop bits).

max. baud rate = usable bit rate *

$$\frac{\text{bit number } N}{\text{bit number } N + \text{start bit} + N \text{ stop bits}}$$

The following table shows the maximum baud rate for the asynchronous data:

| No. of bits N | Max. baud rate for 1 stop bit | Max. baud rate for 1.5 stop bits | Max. baud rate for 2 stop bits |
|---|---|---|---|
| 9 | 59889 | 62611 | 65333 |
| 8 | 61250 | 64313 | 67375 |
| 7 | 63000 | 66500 | 70000 |
| 6 | 65333 | 69417 | 73500 |
| 5 | 68600 | 73500 | 78400 |
| 4 | 73500 | 79625 | 85750 |
| 3 | 81667 | 89833 | 98000 |
| 2 | 98000 | 110250 | 122500 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the transmission of binary asynchronous data from a transmitter via a synchronous channel to a receiver, said binary asynchronous data comprising at least one data word with a data word length of N bits, said at least one data word being enclosed by start and stop bits, extracted from said binary asynchronous data, encoded and transmitted by the transmitter and received and decoded by the receiver, wherein said encoding and decoding are controlled by means of control words which are also transmitted between the transmitter and receiver, comprising the steps of:

during said encoding in the transmitter, splitting said at least one data word between a plurality of frame words of a frame having a frame width of M bits and a frame length of N frame words, wherein an MSB bit of said plurality of frame words is used to distinguish the frame words from the control words;

transmitting said frame and a transmission count value, said transmission count value being determined by a transmission counter in the encoder, and corresponding to a number of transmitted frame words;

receiving in said receiver said transmitted frame and determining a reception count value which corresponds to the number of received frame words and periodically matching the reception count value to the transmission count value.

2. The method as claimed in claim 1, wherein a first control word is transmitted if the transmission of the frame words has been completed, and a second control word is transmitted if there are no new data words in the transmitter but the transmission of the current data word has not yet been completed.

3. The method as claimed in claim 2, wherein said control words are provided with the value determined by the transmission counter.

4. The method as claimed in claim 3, wherein, during the production of the control words, the MSB bit of the control words is set to 1, a first bit is permanently set to 0, a second bit is used to distinguish the first control word from the second control word, and other bits in the control words are set to the value of the transmission counter.

5. The method as claimed in claim 4 wherein another bit in the control word is set to the value of a parity bit.

6. The method as claimed in one of claim 1, wherein the value of the transmission counter is produced in modulo N form.

7. The method as claimed in claim 1, wherein a parity bit is transmitted with the data words.

8. The method as claimed in claim 1, wherein M is less than or equal to N.

9. The method as claimed in claim 1, wherein M is greater than N.

10. The method as claimed in claim 1, wherein said frame length is variable.

* * * * *